United States Patent
Hatten

(10) Patent No.: US 9,993,920 B2
(45) Date of Patent: Jun. 12, 2018

(54) GUITAR PICK RETRIEVER

(71) Applicant: John Hatten, Lakeland, FL (US)

(72) Inventor: John Hatten, Lakeland, FL (US)

( * ) Notice: Subject to any disclaimer, the term of this patent is extended or adjusted under 35 U.S.C. 154(b) by 77 days.

(21) Appl. No.: 15/099,009

(22) Filed: Apr. 14, 2016

(65) Prior Publication Data
US 2017/0297194 A1    Oct. 19, 2017

(51) Int. Cl.
*G10G 7/00* (2006.01)
*B25J 1/04* (2006.01)
*G10D 3/16* (2006.01)

(52) U.S. Cl.
CPC ............. *B25J 1/04* (2013.01); *G10D 3/163* (2013.01)

(58) Field of Classification Search
CPC .................... G10G 7/00; A47F 13/06
See application file for complete search history.

(56) References Cited

U.S. PATENT DOCUMENTS

| | | | | |
|---|---|---|---|---|
| 1,196,703 A * | 8/1916 | Kraut | ........................ | B25B 9/00 269/243 |
| 1,559,657 A * | 11/1925 | Todd | ........................ | G10D 3/02 81/487 |
| 2,108,802 A * | 2/1938 | Dorsey | .................... | G10G 7/00 174/75 C |
| 3,342,090 A * | 9/1967 | Martin | ...................... | B25B 9/00 81/129 |
| 4,137,814 A * | 2/1979 | Rowley | .................. | G10D 3/163 84/322 |
| 4,268,955 A * | 5/1981 | Daniels | .................. | H01R 43/22 29/747 |
| 4,398,759 A * | 8/1983 | Manola | ................. | E01H 1/1206 294/1.4 |
| 4,441,746 A * | 4/1984 | Corboy, Jr. | ............... | B25B 9/00 294/115 |
| 4,696,220 A * | 9/1987 | Pagliaro | .................... | G10D 3/00 84/281 |
| 5,106,139 A * | 4/1992 | Palmer | .................. | B25B 11/007 29/743 |
| 5,290,082 A * | 3/1994 | Palmer | .................. | B25B 11/007 29/743 |
| 5,370,433 A * | 12/1994 | Yost | ......................... | A01D 9/06 294/50.5 |
| 5,423,584 A * | 6/1995 | Pasternak | .............. | A63B 47/02 294/19.2 |
| 5,938,258 A * | 8/1999 | Femling | .................... | B25J 7/00 294/104 |
| 6,242,677 B1 * | 6/2001 | Sander | .................. | G10D 3/163 84/319 |

(Continued)

*Primary Examiner* — Joseph Dillon, Jr.
(74) *Attorney, Agent, or Firm* — Larson & Larson, P.A.; Frank Liebenow; Patrick A. Reid

(57) ABSTRACT

A guitar pick retriever includes an elongated shaft that has a width small enough for fitting between a string of a guitar and an edge of a sound hole of the guitar. The elongated shaft is sufficiently long for reaching within a hollow body of a guitar through a sound hole of the guitar. An attracting device is affixed at one end of the elongated shaft. The attracting device having attractive properties (e.g., suction, static charge, stickiness) such that, upon contact and/or pressure with a guitar pick, the attracting device temporarily holds onto the guitar pick for removing the guitar pick from the hollow body of the guitar.

3 Claims, 2 Drawing Sheets

(56) References Cited

U.S. PATENT DOCUMENTS

| | | | | |
|---|---|---|---|---|
| 6,264,259 B1* | 7/2001 | Fortune | B25B 11/007 294/186 |
| 6,361,094 B1* | 3/2002 | Pelley | A63B 47/02 294/115 |
| 6,593,516 B1* | 7/2003 | Schafer | G10D 9/023 84/383 A |
| 6,903,256 B2* | 6/2005 | Pittman | G10D 3/163 84/320 |
| 7,074,998 B2* | 7/2006 | Hurwicz | G10G 7/00 84/454 |
| 7,256,337 B1* | 8/2007 | Walker | G10D 3/163 84/258 |
| 7,267,052 B1* | 9/2007 | Streng | B30B 9/321 100/218 |
| 8,087,645 B2* | 1/2012 | Hepple | G10D 3/00 261/104 |
| 8,308,026 B2* | 11/2012 | Rapko | B25B 9/00 206/37 |
| 8,487,169 B2* | 7/2013 | Dunlop | F16M 11/041 248/443 |
| 8,668,702 B2* | 3/2014 | Awtar | A61B 17/2909 294/111 |
| 8,716,581 B1* | 5/2014 | Boyd | G10D 3/163 84/329 |
| 9,595,250 B2* | 3/2017 | Ierymenko | G10H 3/26 |
| 9,613,604 B1* | 4/2017 | Shearer | G10G 7/00 |
| 2004/0074219 A1* | 4/2004 | Herndon | A01D 51/002 56/332 |
| 2004/0135387 A1* | 7/2004 | Keith | B25J 1/02 294/209 |
| 2004/0139837 A1* | 7/2004 | Oskorep | G10D 3/163 84/322 |
| 2006/0266397 A1* | 11/2006 | Berl | A61H 3/02 135/70 |
| 2009/0019984 A1* | 1/2009 | Ouellette | G10D 1/08 84/291 |
| 2009/0040746 A1* | 2/2009 | Shefet | A23G 3/563 362/84 |
| 2009/0314795 A1* | 12/2009 | Rapko | B25B 9/00 221/251 |
| 2010/0096866 A1* | 4/2010 | Flinn | E01H 1/1206 294/1.4 |
| 2011/0314994 A1* | 12/2011 | Glass | G10D 3/00 84/453 |
| 2012/0177451 A1* | 7/2012 | Kvalheim | B65G 53/40 406/151 |
| 2013/0186909 A1* | 7/2013 | Rapko | B65D 83/0409 221/260 |
| 2014/0137811 A1* | 5/2014 | Kovarik | E01H 1/1206 119/796 |
| 2015/0075352 A1* | 3/2015 | McDonald | G10D 3/163 84/322 |
| 2015/0080904 A1* | 3/2015 | Kovarik | A01K 15/003 606/113 |
| 2016/0095471 A1* | 4/2016 | Carratura | A47J 43/283 99/421 R |
| 2016/0312420 A1* | 10/2016 | Parazynski | E01H 1/1206 |

* cited by examiner

GUITAR PICK RETRIEVER

FIELD

This invention relates to the field of musical instruments and more particularly to a device for retrieving a guitar pick lost within the body of a guitar.

BACKGROUND

Most any guitar player who plays with a guitar pick on a hollow-body guitar has experienced dropping a guitar pick into the sound hole of the hollow-body guitar. Once the guitar pick finds its way into the hollow body of a guitar, it is very difficult to get out.

Do date, the best way to retrieve a guitar pick from the hollow body of a guitar is to hold the guitar with the sound hole pointing upward and shake the guitar until the guitar pick is located beneath the sound hole and then, in a quick movement, inverting the guitar so the sound hole pints down and, hopefully, the guitar pick falls out of the sound hole. This process usually takes many attempts before the guitar pick falls out, may not look professional during a show, and may result in damage to the guitar and surroundings due to the rapid movement and shaking.

What is needed is a device that will predictably retrieve a lost guitar pick from within the hollow body of a guitar.

SUMMARY

In one embodiment, a guitar pick retriever is disclosed including an elongated shaft that has a width small enough for fitting between a string of a guitar and an edge of a sound hole of the guitar. The elongated shaft is sufficiently long for reaching within a hollow body of a guitar through a sound hole of the guitar. An attracting device is affixed at one end of the elongated shaft. The attracting device having attractive properties (e.g., suction, static charge, stickiness) such that, upon contact and/or pressure with a guitar pick, the attracting device temporarily holds onto the guitar pick for removing the guitar pick from the hollow body of the guitar.

In another embodiment, a method of retrieving a guitar pick that has fallen into a hollow body of a guitar is disclosed including extending a first end of a shaft of a guitar pick retriever into a sound hole of the guitar until an attracting device affixed to the first end of the elongated shaft contacts the guitar pick that has fallen into the hollow body of the guitar. The guitar pick sticks to the attracting device and the shaft is retracted along with the guitar pick from the sound hole of the guitar. Once retracted, the guitar pick is removed from the attracting device with the force of a user's hands.

In another embodiment, a guitar pick retriever is disclosed including an elongated shaft that has a width small enough as to fit between a string of a guitar and an edge of a sound hole of the guitar. The elongated shaft is sufficiently long as to reach a guitar pick that is resting within a hollow body at the back wall of a guitar through a sound hole of the guitar. An attracting device is affixed to one end of the elongated shaft. The attracting device has attractive properties (e.g., suction, static energy, sticky surface) such that, upon contact and/or pressure with the guitar pick, the attracting device temporarily holds onto the guitar pick until a force from a user removes the guitar pick from the attracting device.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
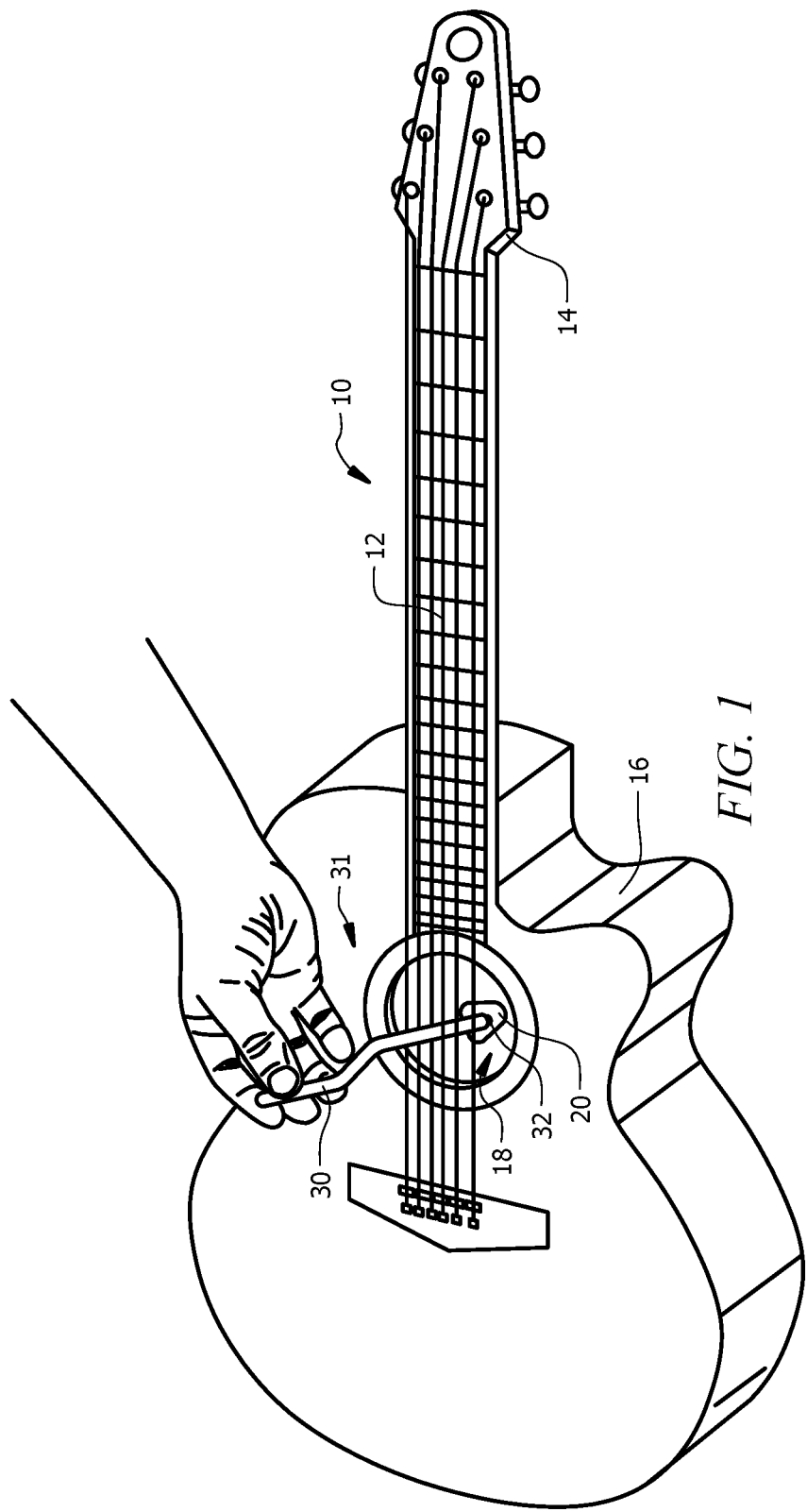
FIG. 1 illustrates a perspective view of a guitar and the guitar pick retriever.

Reference will now be made in detail to the presently preferred embodiments of the invention, examples of which are illustrated in the accompanying drawings. Throughout the following detailed description, the same reference numerals refer to the same elements in all figures.

Throughout this description, the term hollow-body guitar refers to any guitar that has any type of sound hole and hollow cavity in which a guitar pick may be dropped, including acoustic guitars, hollow-body electric guitars, semi-hollow-body electric guitars, etc. The disclosed device is useful for any musical instrument having a hollow cavity into which a pick might fall.

Referring to FIG. 1, a perspective view of a guitar and the guitar pick retriever is shown. Shown is an example of a guitar 10 having a body 16, a neck with tuning knobs 14, and strings 12. Although not necessarily located or shaped as a circle, many hollow-body or semi-hollow body guitars such as the guitar 10 of FIG. 1 have sound holes 18. The sound holes are designed to allow audio waves (e.g., sound) to exit the hollow body 16 of the guitar 10. Many guitar players use a guitar pick 20 to strum the strings. The strings are often strummed over the sound hole 18 and, therefore, picks 20 often find their way into the hollow body 16 through the sound hole 18. As discussed above, once the pick 20 finds its way into the hollow body 16, it is very difficult to extract and retrieve by maneuvering and shaking the guitar 10.

To facilitate retrieval of a guitar pick 20 that has fallen into the hollow body 16 of a guitar 10, an exemplary version of the guitar pick retriever 31 is shown in use. The guitar pick retriever 31 shown has a shaft 30 and an attracting device 32 at one end, shown attracting the guitar pick 20 for dependable removal and retrieval through the sound hole 18 of the guitar 10.

Figure 2:
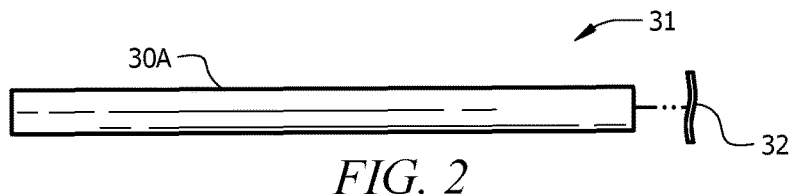
FIG. 2 illustrates a plan view of the guitar pick retriever having a stiff shaft with micro-suction cup material at one end.
Figure 3:
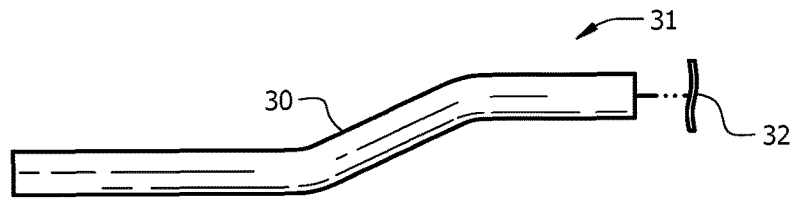
FIG. 3 illustrates a plan view of the guitar pick retriever having a bendable shaft with micro-suction cup material at one end.

Referring to FIGS. 2 and 3, plan views of the guitar pick retriever 31 having a stiff shaft (FIG. 2) or a bendable shaft (FIG. 3) and having micro-suction cup material 32 at one end are shown. Common to all embodiments of the guitar pick retriever 31 is a shaft 30/30A (the shaft 30A being stiff and the shaft 30 being bendable/malleable) and an attraction member 32/34/36. The shaft 30/30A and attraction member 32/34/36 are thin enough as to fit between the strings 12 of the guitar 10 or between the top/bottom string 12 of the guitar 10 and the edge of the sound hole 18. For example, a shaft 30/30A and attraction member 32/34/36 that is approximately ¼ inch in width or less performs well with most guitars 10. In embodiments having a shaft 30 that is bendable/malleable, the shaft 30 is bent by the user to get to guitar picks that are not easily accessible by stiff, linear shafts 30A.

In FIGS. 2 and 3, the attraction member 32/34/36 is a section of suction cup tape 32. Suction cup tape 32 has an adhesive on a first surface that adheres to an end of the shaft 30/30A and surface and thousands of microscopic craters that work by creating many partial vacuums between the suction cup tape 32 and the guitar pick 20, as would a standard suction cup 34 (see FIGS. 4 and 5). In operation, the microscopic craters of the suction cup tape 32 are pressed against the guitar pick 20 that is trapped within the hollow body 16 of the guitar 10, thereby temporarily adhering to the guitar pick 20 using the elongated shaft 30/30A. Then, the guitar pick 20 is removed from the hollow body 16, perhaps first bending the strings to provide ample clearance for the guitar pick 20, and then the guitar pick 20 is easily removed from the microscopic craters of the suction cup tape 32.

Figure 4:
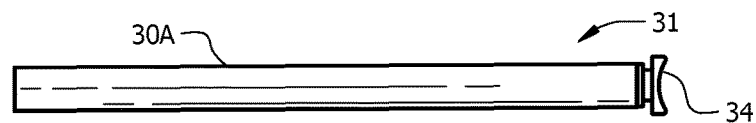
FIG. 4 illustrates a plan view of the guitar pick retriever having a stiff shaft with a miniature suction cup at one end.
Figure 5:
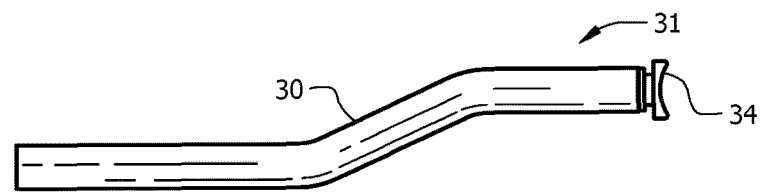
FIG. 5 illustrates a plan view of the guitar pick retriever having a bendable shaft with a miniature suction cup at one end.

Referring to FIGS. 4 and 5, plan views of the guitar pick retriever having a stiff shaft (FIG. 4) or a bendable shaft (FIG. 5) and having a miniature suction cup at one end. In this embodiment, the attraction member 32/34/36 is a miniature suction cup 34. The miniature suction cup 34 is affixed to an end of the shaft 30/30A and when pushed against the lost guitar pick 20, the guitar pick 20 sticks to the miniature suction cup 34.

In operation, the miniature suction cup 34 is pressed against the guitar pick 20 that is trapped within the hollow body 16 of the guitar 10, thereby temporarily adhering to the guitar pick 20 using the elongated shaft 30/30A to exert the pressure. Then, the guitar pick 20 is removed from the hollow body 16, perhaps first bending the strings to provide ample clearance for the guitar pick 20, and then the guitar pick 20 is easily removed from the miniature suction cup 34. Note that it is preferred that the diameter of the miniature suction cup 34 is less than the width of a typical guitar pick 20 to facilitate adhesion.

Figure 6:
FIG. 6 illustrates a plan view of the guitar pick retriever having a stiff shaft with a sticky surface at one end.
Figure 7:
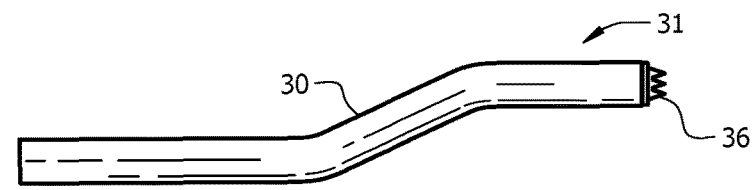
FIG. 7 illustrates a plan view of the guitar pick retriever having a bendable shaft with a sticky surface at one end.

Referring to FIGS. 6 and 7, plan views of the guitar pick retriever having a stiff shaft (FIG. 6) or a bendable shaft (FIG. 7) and having a sticky surface at one end. In this embodiment, the attraction member 32/34/36 is a sticky surface 36. The sticky surface 36 is affixed to an end of the shaft 30/30A and when pushed against the lost guitar pick 20, the guitar pick 20 sticks to the sticky surface 36.

In operation, the sticky surface 36 is pressed against the guitar pick 20 that is trapped within the hollow body 16 of the guitar 10, thereby temporarily adhering to the guitar pick 20 using the elongated shaft 30/30A to exert the pressure. Then, the guitar pick 20 is removed from the hollow body 16, perhaps first bending the strings to provide ample clearance for the guitar pick 20, and then the guitar pick 20 is easily removed from the sticky surface 36.

The sticky surface is either a flat sticky surface such as a temporary adhesive such as double-sided tape, removable 3798LM gummy glue (from 3M Corporation). The gummy glue 3798LM is a low temperature fugitive glue that is easily removed without residual tack or residue and provides a non-permanent bond (the material used to hold credit cards to mailing paper). Alternately, the sticky surface is not flat, being a wad of sticky material disposed at the end of the shaft 30/30A. As an example of such a sticky material, a wad of gummy glue or a wad of material known as adhesive putty (e.g., adhesive putty from the Scotch Corporation).

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method of retrieving a guitar pick that has fallen into a hollow body of a guitar, the method comprising:
   extending a first end of a shaft of a guitar pick retriever into a sound hole of the guitar such that an attracting device comprising gummy glue affixed to the first end of the elongated shaft contacting the guitar pick that has fallen into the hollow body of the guitar, thereby the guitar pick sticking to the attracting device;
   retracting the shaft with the guitar pick from the sound hole of the guitar; and
   removing the guitar pick from the attracting device with a force of a user's hands.

2. The method of claim 1, wherein the elongated shaft is bendable.

3. The method of claim 1, wherein the elongated shaft is malleable.

* * * * *